US 9,528,426 B2

United States Patent
Doran et al.

(10) Patent No.: US 9,528,426 B2
(45) Date of Patent: Dec. 27, 2016

(54) METHOD OF ESTIMATING DURATION OF AUTO-IGNITION PHASE IN A SPARK-ASSISTED COMPRESSION IGNITION OPERATION

(71) Applicant: Robert Bosch GmbH, Stuttgart (DE)

(72) Inventors: Eric M. Doran, Palo Alto, CA (US); David J. Cook, Mountain View, CA (US); Joel Oudart, Sunnyvale, CA (US); Nikhil Ravi, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 14/272,855

(22) Filed: May 8, 2014

(65) Prior Publication Data
US 2014/0331959 A1   Nov. 13, 2014

Related U.S. Application Data

(60) Provisional application No. 61/821,102, filed on May 8, 2013.

(51) Int. Cl.
*F02B 1/12* (2006.01)
*F02P 5/00* (2006.01)
(Continued)

(52) U.S. Cl.
CPC ............ *F02B 11/00* (2013.01); *F02D 35/025* (2013.01); *F02D 35/026* (2013.01);
(Continued)

(58) Field of Classification Search
CPC ......... F02B 11/00; F02B 1/14; F02D 41/3041; F02D 41/005; F02D 41/006; F02D 41/0025
(Continued)

(56) References Cited

U.S. PATENT DOCUMENTS 6,947,830 B1 * 9/2005 Froloff ................. F02D 35/023
701/111
7,168,420 B1   1/2007 Yang
(Continued)

FOREIGN PATENT DOCUMENTS

EP   1167734 A2   1/2002
EP   1134400 B1   1/2012

OTHER PUBLICATIONS

International Search Report and Written Opinion corresponding to PCT Application No. PCT/US2014/037346, mailed Sep. 22, 2014 (12 pages).
(Continued)

*Primary Examiner* — Lindsay Low
*Assistant Examiner* — Syed O Hasan
(74) *Attorney, Agent, or Firm* — Maginot Moore & Beck LLP

(57) ABSTRACT

A combustion engine system in one embodiment includes a combustion engine, at least one controllable component operably connected to the combustion engine, at least one sensor configured to sense a parameter associated with the combustion engine, and an electronic control unit (ECU) operably connected to the at least one controllable component and the at least one sensor, wherein the ECU is configured to determine a temperature of an unburned mixture based upon the sensed parameter, and control the at least one controllable component based upon the determined temperature.

16 Claims, 2 Drawing Sheets

(51) Int. Cl.
*F02B 5/00* (2006.01)
*F02B 11/00* (2006.01)
*F02D 41/30* (2006.01)
*F02D 35/02* (2006.01)
*F02D 41/14* (2006.01)

(52) U.S. Cl.
CPC ....... *F02D 35/028* (2013.01); *F02D 41/3041* (2013.01); *F02D 2041/1412* (2013.01); *Y02T 10/42* (2013.01)

(58) Field of Classification Search
USPC .......... 123/27 R, 305, 406.55, 406.41, 90.18
See application file for complete search history.

(56) References Cited

U.S. PATENT DOCUMENTS

| | | | |
|---|---|---|---|
| 2002/0059914 A1 | 5/2002 | Yamaguchi et al. | |
| 2004/0045283 A1* | 3/2004 | Asada ................ | F02D 13/0207 60/285 |
| 2004/0220720 A1 | 11/2004 | Noda | |
| 2005/0072400 A1* | 4/2005 | Kojic ........................ | F02B 1/12 123/256 |
| 2005/0183697 A1 | 8/2005 | Yoshino et al. | |
| 2006/0231066 A1* | 10/2006 | Demura ................ | F02D 35/023 123/305 |
| 2010/0228466 A1* | 9/2010 | Ekchian .............. | F02D 13/0273 701/113 |
| 2012/0118267 A1 | 5/2012 | Kang et al. | |
| 2012/0118275 A1 | 5/2012 | Kang et al. | |
| 2013/0073173 A1 | 3/2013 | Hellstrom et al. | |
| 2013/0073185 A1 | 3/2013 | Hellstrom et al. | |

OTHER PUBLICATIONS

Persson, H., et al., "Investigation of the Early Flame Development in Spark Assisted HCCI Combustion Using High Speed Chemiluminescence Imaging," 2007, SAE Technical Paper. 2007-01-0212, U.S. (14 pages).

Olesky, et al., "The effects of spark timing, unburned gas temperature, and negative valve overlap on the rates of stoichiometric spark assisted compression ignition combustion," 2013, Applied Energy, vol. 105, pp. 407-417, U.S.

Lavoie, et al., "A multi-mode combustion diagram for spark assisted compression ignition," 2010, Comb. and Flame, vol. 157, pp. 1106-1110, U.S., (5 pages).

Manofsky, et al., "Bridging the Gap between HCCI and SI: Spark-Assisted Compression Ignition," 2011, SAE Technical Paper. 2011-01-1179, U.S. (18 pages).

* cited by examiner

METHOD OF ESTIMATING DURATION OF AUTO-IGNITION PHASE IN A SPARK-ASSISTED COMPRESSION IGNITION OPERATION

This application claims the benefit of U.S. Provisional Application No. 61/821,102 filed May 8, 2013, the entirety of which is incorporated herein by reference.

FIELD

The present disclosure relates to a combustion control strategy for a Spark Assisted Compression Ignition (SACI) engine control unit.

BACKGROUND

Internal combustion engines generally fall into one of two categories. The two categories are (i) spark ignition and (ii) compression ignition. Spark ignition engines introduce a fuel/air mixture into combustion cylinders. The fuel/air mixture is then compressed in a compression stroke and ignited by a spark plug. Gasoline engines such as those found in automobiles are typically spark ignition engines. Compression ignition engines introduce or inject pressurized fuel into a combustion cylinder when the cylinder is in a condition referred to as "top dead center" (TDC). At this position, the cylinder is close to its maximum compression. At the pressure and temperature within the cylinder at TDC, the fuel is spontaneously ignited. Diesel engines are typically compression ignition engines.

Each of the above identified categories of engines have advantages and disadvantages. In general, gasoline engines produce fewer emissions but are less efficient while diesel engines are more efficient but produce more emissions.

The search for a combustion concept which marries the benefits of both spark ignition and compression ignition strategies has led to a concept called homogenous Charge Compression Ignition (HCCI). The HCCI combustion process has been studied for over two decades, and has shown significant promise as a potential technology for automotive engines that can improve on the efficiency and emissions capabilities of currently technologies. In this process, a homogeneous mixture of air, fuel and hot exhaust gases is compressed till auto-ignition occurs. Combustion is initiated not by a spark, but rather just through compression, and is governed by the in-cylinder temperature and mixture composition. A significant amount of hot exhaust gas from the previous cycle is usually trapped within the cylinder to enable this auto-ignition; however other methods for initiating HCCI have also been tested, including increasing the compression ratio and heating the intake air.

Another approach incorporates compression, but also relies upon spark ignition. This approach is referred to as Spark Assisted Compression Ignition (SACI). SACI combustion is mixed-mode form of combustion wherein a spark is used to initiate a propagating premixed flame that consumes a portion of the fuel and air charge to provide additional effective compression to the unburned mixture causing it to auto-ignite earlier than it would otherwise, thus combining characteristics of conventional spark ignition (SI) and compression ignition (CI) operation. The resulting heat release rate from SACI combustion therefore is faster than SI but slower than HCCI.

Various control algorithms have been developed to control timing of various operations in the combustion cycle in the various ignition approaches. In general, the control algorithms obtain inputs from various sensors and control various components in the engine system to optimize, for example, fuel efficiency, power, responsiveness, etc. One such control system is disclosed in U.S. Patent Publication No. 2013/0073173, published on Mar. 21, 2013, the entire contents of which are herein incorporated by reference.

Because the SACI approach is a mixed approach, however, the control algorithms which are used in other approaches are not optimized for characterizing the SACI auto-ignition event. By way of example, the duration of the auto-ignition combustion event is typically modeled as a function of the time or engine position at which the initiation of the combustion event is determined to occur. That is, the combustion duration is determined according to the following equation:

$$\Delta\theta_{AI} = f(\theta_{AI}) \quad (1)$$

where "$\Delta\theta_{AI}$" is the auto-ignition combustion duration in time or crank angle, and "$\theta_{AI}$" is the time or engine position at combustion initiation. The functional dependence is typically assumed to be linear according to the following equation:

$$\Delta\theta_{AI} = a\theta_{AI} + b \quad (2)$$

where a and b are parameters that can be fit according to operating characteristics. FIG. 1 depicts a chart 10 which plots the auto-ignition burn duration as a function of the start of auto-ignition over a range of different conditions and control inputs that might be used in SACI operation in reliance upon the foregoing equations. FIG. 1 shows that in SACI operation, the duration of the auto-ignition phase is effectively decoupled from the start of combustion and Equation (2) no longer holds.

In view of the foregoing, it would be advantageous to provide a more accurate approach for modeling the duration of the auto-ignition phase in SACI operation. A system including a method for more accurately predicting the duration of the auto-ignition combustion phase of an internal combustion engine when operated in a SACI mode would also be beneficial.

SUMMARY

In order to fully characterize SACI combustion, information about each combustion phase is required in addition to single features such as combustion phasing. For physics based control algorithms, the duration of the auto-ignition phase should be known. This disclosure presents a functional relationship for this auto-ignition burn duration and other engine states typically used for control.

In accordance with one embodiment, an electronic control unit (ECU) for an engine includes a physics-based characterization of SACI combustion with prediction of auto-ignition duration based on unburnt temperature states.

In another embodiment, an ECU includes a real-time model based control algorithm implemented in the ECU for control of SACI combustion.

In a further embodiment, a combustion engine system includes a combustion engine, at least one controllable component operably connected to the combustion engine, at least one sensor configured to sense a parameter associated with the combustion engine, and an electronic control unit (ECU) operably connected to the at least one controllable component and the at least one sensor, wherein the ECU is configured to determine a temperature of an unburned mixture based upon the sensed parameter, and control the at least one controllable component based upon the determined temperature.

In yet another embodiment, a method of controlling a combustion engine system includes generating temperature data corresponding to a temperature of an unburned mixture within a combustion engine with an electronic control unit (ECU), and controlling at least one controllable component with the ECU based upon the generated temperature data.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION OF THE DISCLOSURE

Figure 1:
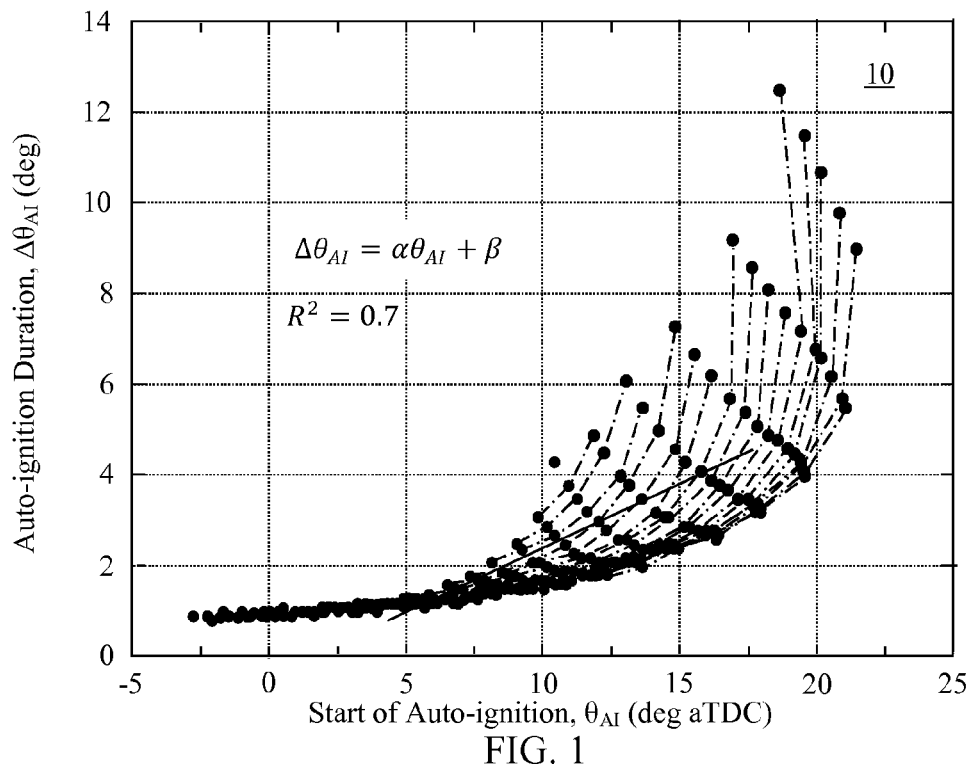
FIG. 1 depicts a chart of the dependence of auto-ignition duration on start of auto-ignition for varying premixed combustion phases and initial thermal states.

While the systems and algorithms described herein are susceptible to various modifications and alternative forms, specific embodiments thereof have been shown by way of example in the drawings and will herein be described in detail. It should be understood, however, that there is no intent to limit the systems and algorithms to the particular forms disclosed. On the contrary, the disclosure is to cover all modifications, equivalents, and alternatives falling within the spirit and scope of the disclosure.

Figure 2:
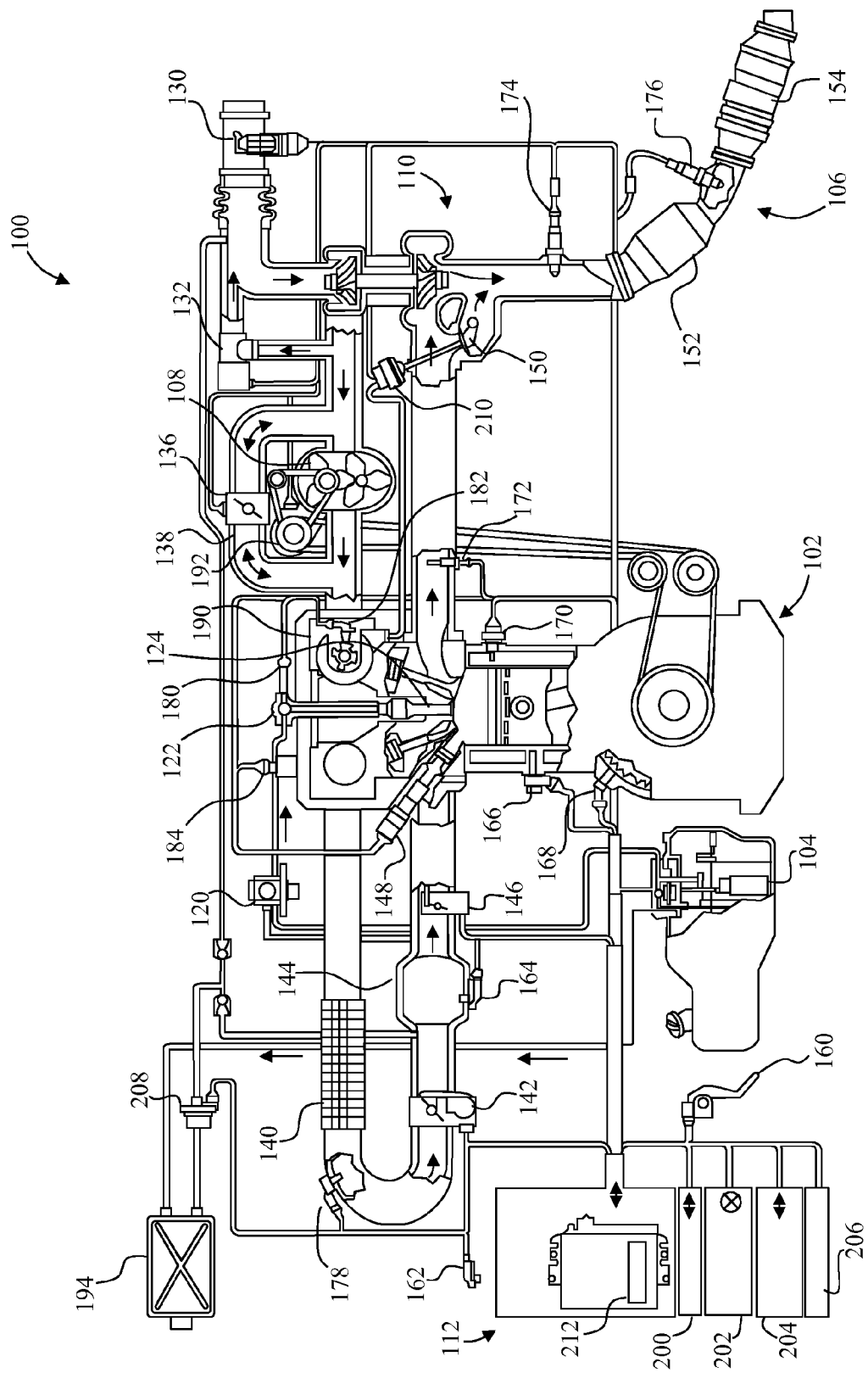
FIG. 2 depicts a diagram of an internal combustion system including an algorithm for predicting the duration of the auto-ignition combustion phase of an internal combustion engine when operated in SACI mode.

Referring to FIG. 2, a SACI combustion engine system 100 is shown. the system 100 includes an engine 102, a fuel tank 104 with a fuel pump module, an exhaust system 106, a super charger 108, a turbocharger 110, and an electronic control unit (ECU) 112. A fuel pump 120 takes a suction on the fuel tank 104 and discharges to a fuel rail 122. The fuel rail 122 feeds a fuel injector 124.

Air is supplied through an air mass meter 130 and the turbo charger 110 into the super charger 108. A dump valve 132 controllably recirculates air to the inlet of the turbocharger 110. A super charger control valve 136 is located in a bypass 138 of the super charger 108. Air moves from the super charger 108 through an intercooler 140 and an electronic throttle control 142 an into an intake manifold 144. An air supply solenoid control valve 146, which in various embodiments is a swirl or tumble control valve (on/off or continuous), controls air supply into the engine 102. A spark plug 148 is provided in the engine 102.

Exhaust from the engine 102 is directed to the turbocharger 110 which includes a waste gate 150. Exhaust then passes through a pre-catalyst 152 and a main catalyst 154.

Figure 3:
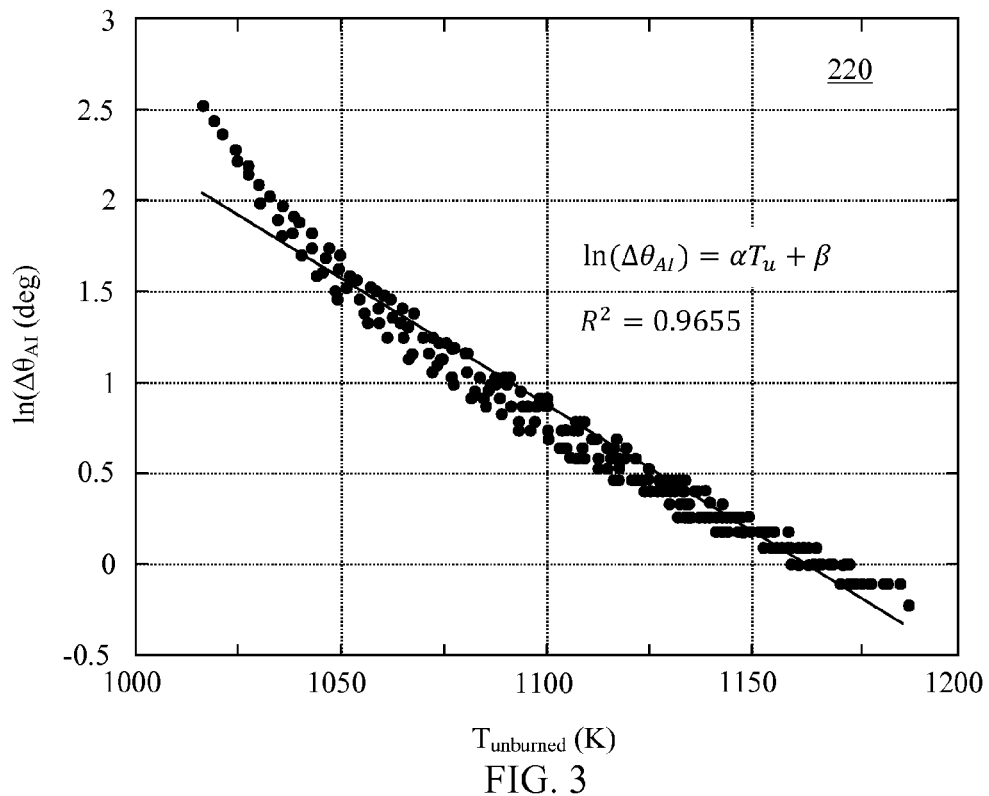
FIG. 3 depicts dependence of auto-ignition duration unburned temperature at start of auto-ignition phase.

Operation of the system 100 is controlled by the ECU 112 which is operably connected to a number of sensors and controllers as depicted in FIG. 3. The sensors and controllers sense and control various parameters associated with the combustion engine. The ECU thus receives input from an accelerator pedal module 160, an ambient pressure sensor 162, an intake manifold sensor 164, a knock sensor 166, and a speed sensor 168. Additional input is available from an engine temperature sensor 170, an exhaust temperature sensor 172, oxygen sensors 174 and 176, a boost pressure sensor 178, a fuel pressure sensor 180, and the air mass meter 130. The ECU further receives input from one or more cylinder pressure sensors (not shown).

The system 100 further includes controllable components such as a phase sensor 182 which is operably connected to a camshaft phaser 184 (shown on the intake side but is alternatively positioned on the exhaust) and the spark plug 148. Other controllable components in the system 100 include a vacuum pump 190, a solenoid clutch 192, and a carbon canister 194.

The ECU 112 includes a controller area network (CAN) 200 network protocol for interfaced devices, a warning lamp 202, a diagnostic interface 204, and an immobilizer 206. The ECU 112 uses the various inputs described above in controlling the above identified controllable components and other controllable components such as a canister purge valve 208, a waste gate actuator 210, and the other components shown in FIG. 3. While performance of the system is enhanced by incorporation of a larger number of sensors and controllable components, in some embodiments the sensors/controllable components include any desired one or any desired combination of the sensors/controllable components selected from a group including the sensors and controllable components described herein.

In one embodiment, the control algorithm is similar to that of the '173 Publication. Accordingly, while most of the control provided by the ECU 112 is readily understood by those of ordinary skill in the art, the ECU 112 controls combustion within the engine 102 using a control algorithm which includes a model 212 stored within a memory associated with the ECU which provides improved prediction of the duration of the auto-ignition combustion phase of an internal combustion engine when operated in a SACI mode.

Within the model 212, the auto-ignition phase duration is functionally related to the temperature of the unburned mixture at the start of the auto-ignition phase. That is, $$\Delta\theta_{AI} = f(T_u | \theta_{AI}) \tag{3}$$

where $T_u$ is the temperature of the unburned mixture that will ultimately undergo auto-ignition. FIG. 3 depicts a chart 220 of the dependence of auto-ignition duration unburned temperature at start of auto-ignition phase. Chart 220 indicates that the same range of auto-ignition durations due to different engine states and control inputs have a single functional dependence on the unburned temperature at auto-ignition. Furthermore, the functional form of this relationship is linear in a linear-log space and can therefore be written as $$\ln(\Delta\theta_{AI}) = \alpha(T_u | \theta_{AI}) + \beta \tag{4}$$

where $\alpha$ and $\beta$ are parameters that can be adjusted according to the operating conditions considered.

While in some embodiments the temperature of the unburned mixture is obtained directly using a sensor, in other embodiments the model 212 predicts the temperature of the unburned mixture using data associated with combustion engine parameters. The parameters relate to one or more of the sensors and controllable components identified above. While any desired algorithm for predicting the unburned mixture temperature may be used, in one embodiment the valve timings, EGR rate, fuel mass flow, intake temperature, intake pressure, and cylinder pressure are used in a two-zone model incorporating the algorithms above to estimate the unburned mixture temperature.

The disclosure herein thus provides a method for predicting the duration of the auto-ignition combustion phase of an internal combustion engine when operated in a Spark Assisted Compression Ignition (SACI) mode.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A combustion engine system, comprising:
   a combustion engine;
   at least one controllable component operably connected to the combustion engine;
   at least one sensor configured to sense a parameter associated with the combustion engine; and
   an electronic control unit (ECU) operably connected to the at least one controllable component and the at least one sensor, wherein the ECU is configured to
   determine a temperature of an unburned mixture based upon the sensed Parameter, and
   control the at least one controllable component based upon the determined temperature, wherein the ECU is configured to control the at least one controllable component based upon the following equation:

$ln(\Delta\theta_{AI})=\alpha(T_u|\theta_{AI})+\beta$, wherein "$\Delta\theta_{AI}$" is the auto-ignition combustion duration in time or crank angle,
   "$T_u$" is the determined temperature of the unburned mixture that will ultimately undergo auto-ignition,
   "$\theta_{AI}$" is the time or engine position at combustion initiation, and
   "$\alpha$" and "$\beta$" are parameters associated with an operating condition of the engine system.

2. The combustion engine system of claim 1, wherein:
   the at least one controllable component comprises a spark plug; and
   the ECU is configured to control the spark plug based upon the determined temperature.

3. The combustion engine system of claim 2, wherein:
   the at least one controllable component comprises a camshaft phaser; and
   the ECU is configured to control the camshaft phaser based upon the determined temperature.

4. The combustion engine system of claim 3, wherein:
   the at least one controllable component comprises a fuel pump; and
   the ECU is configured to control the fuel pump based upon the determined temperature.

5. The combustion engine system of claim 1, wherein the at least one sensor comprises one or more sensors of a group of sensors, the group of sensors including an accelerator pedal module, an ambient pressure sensor, an intake manifold sensor, a knock sensor, a speed sensor, an exhaust temperature sensor, an oxygen sensor, a boost pressure sensor, a fuel pressure sensor, a cylinder pressure sensor, and an air mass meter.

6. The combustion engine system of claim 5, wherein the at least one sensor comprises each of the sensors in the group of sensors.

7. The combustion engine system of claim 5, wherein the at least one controllable component includes one or more controllable components of a group of controllable components, the group of controllable components including a canister purge valve, a waste gate actuator, a cam phaser, a spark plug, a fuel pump, a turbo charger, a super charger, a dump valve, a vacuum pump, and an air supply control valve.

8. The combustion engine system of claim 7, wherein the at least one controllable component comprises each of the group of controllable components.

9. A method of controlling a combustion engine system, comprising:
   generating temperature data corresponding to a temperature of an unburned mixture within a combustion engine with an electronic control unit (ECU); and
   controlling at least one controllable component with the ECU based upon the generated temperature data, wherein controlling at least one controllable component comprises:
   controlling the at least one controllable component based upon the following equation:

$ln(\Delta\theta_{AI})=\alpha(T_u|\theta_{AI})+\beta$, wherein "$\Delta\theta_{AI}$" is the auto-ignition combustion duration in time or crank angle,
   "$T_u$" is the generated temperature of the unburned mixture that will ultimately undergo auto-ignition,
   "$\theta_{AI}$" is the time or engine position at combustion initiation, and
   "$\alpha$" and "$\beta$" are parameters associated with an operating condition of the engine system.

10. The method of claim 9, wherein controlling at least one controllable component comprises:
    controlling a spark plug based upon the obtained temperature data.

11. The method of claim 10, wherein controlling at least one controllable component comprises:
    controlling a camshaft phaser based upon the obtained temperature data.

12. The method of claim 11, wherein controlling at least one controllable component comprises:
    controlling a fuel pump based upon the obtained temperature data.

13. The method of claim 9, wherein generating temperature data comprises:
    generating temperature data based upon data obtained from one or more sensors of a group of sensors, the group of sensors including an accelerator pedal module, an ambient pressure sensor, an intake manifold sensor, a knock sensor, a speed sensor, an exhaust temperature sensor, an oxygen sensor, a boost pressure sensor, a fuel pressure sensor, a cylinder pressure sensor, and an air mass meter.

14. The method of claim 13, wherein controlling at least one controllable component comprises:
    controlling the at least one controllable component based upon data obtained from each sensor of the group of sensors.

15. The method of claim 13, wherein controlling at least one controllable component comprises:
    controlling one or more controllable components of a group of controllable components, the group of controllable components including a canister purge valve, a waste gate actuator, a cam phaser, a spark plug, a fuel pump, a turbo charger, a super charger, a dump valve, and an air supply control valve.

16. The method of claim 15, wherein controlling at least one controllable component comprises:
    controlling each of the group of controllable components.

* * * * *